United States Patent [19]

Meyer, Jr.

[11] Patent Number: 4,574,487

[45] Date of Patent: Mar. 11, 1986

[54] EFFECTIVE DIAMETER GAGES

[76] Inventor: Franklin Meyer, Jr., P.O. Box 1, Forestdale, R.I. 02324

[21] Appl. No.: 609,729

[22] Filed: May 14, 1984

Related U.S. Application Data

[63] Continuation-in-part of Ser. No. 370,253, Apr. 20, 1982, abandoned.

[51] Int. Cl.⁴ .............................................. G01B 5/12
[52] U.S. Cl. .................................................. 33/178 R
[58] Field of Search ............. 33/147 K, 147 F, 178 R, 33/178 E

[56] References Cited

U.S. PATENT DOCUMENTS

| | | | |
|---|---|---|---|
| 1,652,854 | 12/1927 | Darlington | 33/178 R |
| 2,556,230 | 6/1951 | Starbuck | 33/178 R |
| 2,830,375 | 4/1958 | Zwayer | 33/178 R |
| 3,940,856 | 3/1976 | Meyer, Jr. | 33/178 R |
| 4,067,114 | 1/1978 | Meyer, Jr. | 33/178 R |
| 4,227,310 | 10/1980 | Vanderwal, Jr. | 33/178 R |

FOREIGN PATENT DOCUMENTS 224234  6/1943  Switzerland ...................... 33/178 R Primary Examiner—Richard R. Stearns
Attorney, Agent, or Firm—Maurice R. Boiteau

[57] ABSTRACT

There is disclosed in the present application, a gage particularly adapted to measuring the effective interior diameter of a workpiece or part which is too flexible to be measured at separated points of its internal diameter. Such parts, which may be of metal or plastic, include thin walled containers, the skins of cylindrical drums or shields and similar articles which have interior diameters designed to be closely fitted to rigid frames at assembly. The present gage is formed to restrain the part against distortion by forces incident to measuring, which would otherwise cause the part to become narrower in the direction perpendicular to that of the measuring force and would be the source of substantial error in gaging the effective interior dimension of the undistorted part for purposes of assembly. In addition, the present gage includes a provision for automatically translating the circumference measurement of the part into the effective diameter of the part in undistorted condition.

6 Claims, 10 Drawing Figures

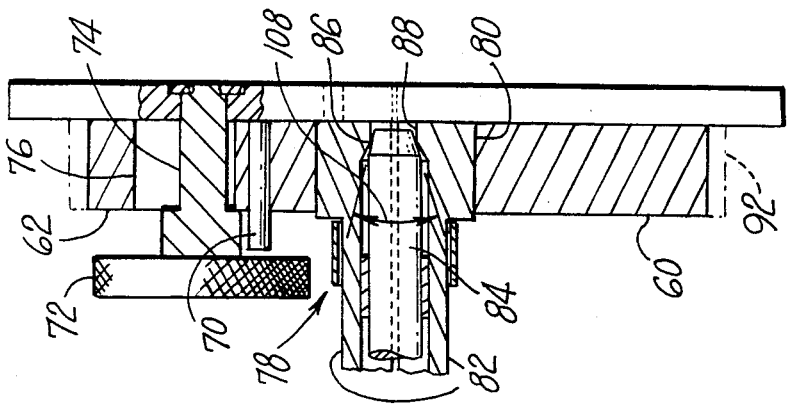
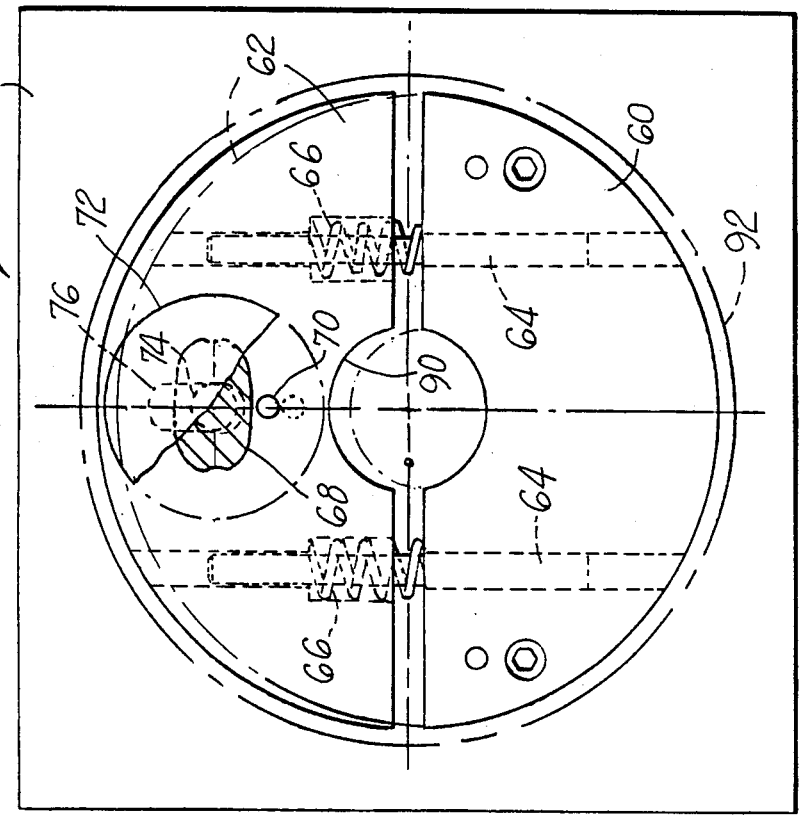

EFFECTIVE DIAMETER GAGES

The present application is a continuation in part of my prior application for U.S. Letters Patent Ser. No. 370,253, filed, Apr. 20, 1982 and now abandoned.

The present invention relates generally to improvements in plug gages but more particularly to such gages which are especialy adapted to measuring the effective interior diameter of relatively flexible parts or workpieces by measuring the inteior circumference and translating the circumference measurement into the effective diameter of the part in undistorted condition.

In the manufacture of a variety of articles a troublesome problem is the insertion of a rigid frame or hub into the interior of a flexible skin or shield to produce a lightweight, relatively rigid assembly. The problem arises in measuring the effective internal diameter of the flexible part, which by being easily deformed is difficult to measure in order to obtain a required close fit over the matching diameter of the frame. In addition, the insertion of an incompressible or incontractible gage such as a standard "go" plug gage also frequently requires skillful manipulation and is both time consuming and inefficient, even when successfully accomplished. In many instances, the difficulties of such measurements are further compounded by the fact that the parts are sometimes of relatively large diameters.

One expedient which has been recommended is the use of an expanding plug gage such as that disclosed in U.S. Pat. No. 1,652,874 issued Dec. 13, 1927 to Philip J. Darlington. That gage and all gages which have heretofore been patented or produced in the Darlington mode are designed to measure rigid parts only and at two points in the plane of plug expansion. In addition, if a Darlington type gage is employed for measuring the interior diameter of a flexible part, the reading obtained because of the deformation of the part and not because of any defect in the gage, is substantially in error and frequently results in a defective assembly.

It is accordingly an object of the present invention to improve both the efficiency and accuracy in the measurement of the interior diameter of flexible parts.

Another object is to enhance the fit of thin flexible tubular parts at assembly on usually rigid mating parts.

A more general object is to reduce the cost of manufacturing while improving the accuracy and quality of assemblies including flexible tubular members.

A more specific object is to permit the measurement of flexible parts, which deform in the measuring process, without requiring a supplementary adjustment of the observed measurement data to compensate for the deformation.

In the achievement of the foregoing objects, a feature of the invention relates to an expanding plug gage having a slotted body, which is coupled to an amplifier-indicator of the type disclosed in the above identified Darlington patent. The expansion of the plug occurs in a direction perpendicular to the length of the slot but the body is so constructed according to a feature of the invention that the part being measured is restrained against contraction in the direction of the slot. According to a further feature of the invention, in certain circumstances involving workpieces having more than minimal stiffness, a part of the contour of the plug gage may be relieved in an area which will be bridged by the workpiece while further facilitating entry into the workpiece.

An important feature of the invention relates to a change in the included angle of a tapered plunger from which is obtained a part of the amplification of the size measurement for display on an indicator dial. In conventional Darlington gage applications, the included angle of the plunger is calculated to translate the contact of the plug gage in a single plane into a size measurement displayed on the dial. According to the present feature, the included angle of the plunger is adjusted to compensate for the fact that the part conforms to the circumference of the plug gage rather than being contacted in a single plane. The adjustment in the included angle of the plunger thus results in a true reading of the effective diameter of a flexible part.

The foregoing objects and features together with numerous advantages resulting from the present invention will be more fully appreciated from the following detailed description of illustrative embodiments of the invention, taken in connection with the accompanying drawings in which:

FIG. 5 is a plan view of a measuring fixture according to the present invention, employed generally with flexible workpieces of relatively large diameters;

FIG. 6 is a view in longitudinal cross section showing the interior construction of the fixture of FIG. 5 and an expanding plug gage employed in conjunction with the fixture;

Figures 1, 2:
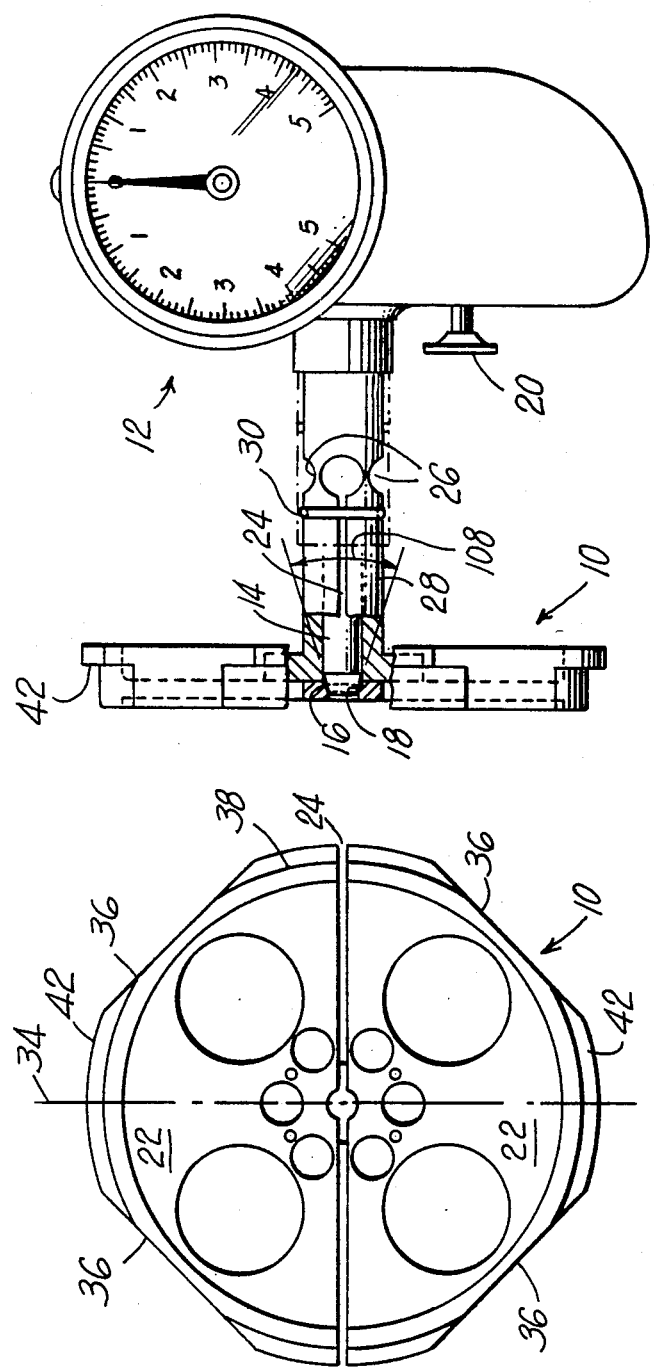
FIG. 1 is a view in side elevation of a gaging assembly according to the present invention and including an expandable plug coupled to an amplifier-indicator.
FIG. 2 is a bottom view of the plug included as a part of the gage assembly of FIG. 1.
Figure 4:
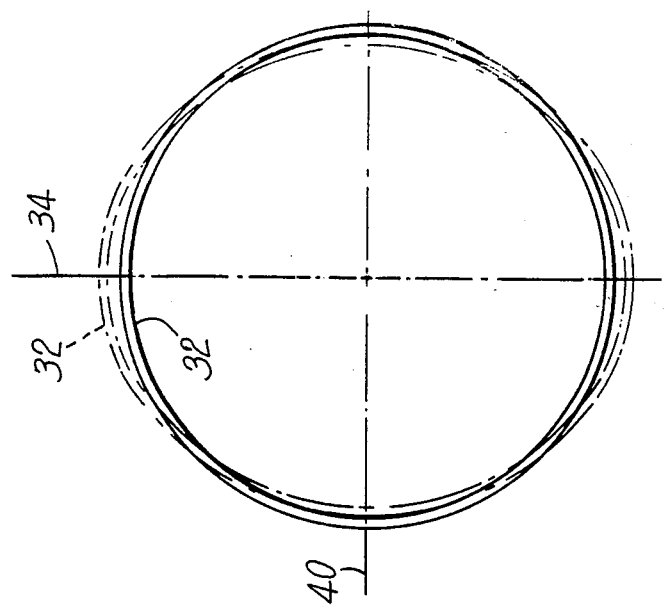
FIG. 4 is a schematic view depicting superposed outlines of a part in deformed condition which would result in gaging inaccuracies and in a preferable condition approaching a cylindrical shape as a result of employing the present gaging assembly.

Turning now to the drawings, there is show, particulary in FIGS. 1 and 2, a gage assembly according to the invention and comprising an expanding plug or gage head indicated generally at 10 and an amplifier-indicator according to the above identified Darlington patent, designated generally at 12, and sometimes referred to simply either as the indicator or the amplifier. The amplifier-indicator 12 is coupled to the expanding plug 10 in the manner disclosed in my U.S. Pat. No. 4,067,114 issued Jan. 23, 1978, by a connection including a plunger 14 detachably connectible to the amplifier 12 and formed with a tapered distal end 16 resiliently pressed by the amplifier into a cylindrical socket 18 formed in the plug 10. As in the case of other gages which are normally coupled to an amplifier 12, the plunger 14 is retracted by pressing a button 20 on the amplifier to allow the gage head 10 consisting of equal halves 22 divided by a slot 24 to contract for ease of entry into the workpiece or part to be measured. Contraction of the gaging head is accomplished by spring pressure from a hinge section 26 formed integral with a stem 28 and assisted a by garter spring 30 embracing the stem. The halves of the gage head 10 are in turn fixedly mounted upon the distal ends of legs into which the stem is divided from the hinge section 26.

In measuring the interior diameter of a readily deformable workpiece 32, the expansion of the gage head along a line 34 generally perpendicular to the slot 24 causes the workpiece, if unrestrained, to become unduly elongated along the line 34 and thus to provide an erroneous reading of effective diameter. In order to avoid such a false reading, the halves 22 of the gage head 10 are formed to prevent the contraction of the workpiece along the length of the slot 24. This is accomplished by grinding the gage head to a cylindrical shape less than the minimum workpiece diameter to be measured and relying on the expansion of the slot 24 to provide an accurate indication of the effective internal diameter of the workpiece. The gage head 10, seen in FIG. 2, is especially suited to a workpiece of limited flexibility such that it would be sufficiently deformed by the gaging force to prevent accurate measurement but resilient enough to bridge a pair of flats 36 in each half 22 in a continuing arc without tightly embracing the flats. The gage head configuration including the flats 36 permits the insertion of the gage head 10 into the workpiece by the use of considerably less force than is required with a gage head which is not partially relieved. In any event, the diameter 38 a few thousandths of an inch below the minimumm workpiece diameter provides flanks on each gage half adjacent the slot 24 to prevent contraction of the workpiece and a measuring surface at each half on both sides of the line 34. The flanks provided by the diameter 38 adjacent the slot 24 are included in the partially relieved plug 10 to prevent collapse of the workpiece in the direction of the slot, as is also the case, regardless of workpiece diameter with full contact plugs.

In the measurement of diameters, gages of the conventional Darlington type, as shown by the above identified patent, all other Darlington patents and the conventional practice of the Comtor Company which was a successor to Darlington, was to measure diameters of essentially rigid parts across two points in a single plane as will be more fully explained below. In addition, when diameters above about two incles were being measured in parts considered rigid, the practice of Darlington and the Comtor Company was to employ expanding plugs flatted at the ends of the slot to offer no contact whatsoever with the part except in the measuring plane. Another serious failure of conventional Darlington type gages, even those designed for smaller diameters and offering full contact, when used incorrectly for measuring the effective diameter of flexible parts, is that their calibration for rigid parts gives an erroneous reading of the size of flexible parts, as will also be explained below.

As the gage head 10 is expanded, the workpiece conforms to the shape of the gage head, and in so doing, bridges the relief flats, as already explained with reference to the version of FIGS. 1 and 2, if the workpiece is sufficiently resilient to warrant the use of a relieved gage head. If, on the other hand, the workpiece is sufficiently flexible that it would tightly embrace the reliefs, a full plug is employed as will be explained and described. In either case, however, the enlargement of the gage head 12, occurring as an expansion of the slot 24, designated in FIG. 3 as a line 40, is amplified in being coupled to the amplifier by the included angle of the tapered end 16 of the plunger 14. If the workpiece being measured were rigid, the included angle of the plunger tip would be calculated to translate differences in diameter into corresponding graduations on the dial of the indicator. In the case of a flexible workpiece which conforms to the fixed size of the gage head, however, the included angle of the tapered end 16 is adjusted to translate differences in circuference as measure by expansion of the slot 24, into values of effective diameter.

When gaging a workpiece having an end surface normal to the axis, a shoulder 42 is provided on both halves of the gage head 10 to limit the entry of the gage head into the workpiece and to assist in aligning the gage assembly. However, for gaging workpeces which either have unfinished ends or which are otherwise unsuited to such engagement, the use of the shoulder may be eliminated.

Figure 3:
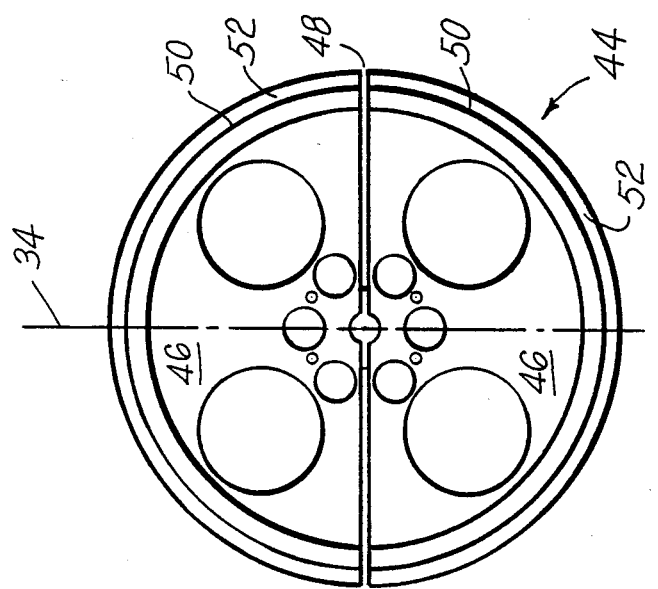
FIG. 3 is a bottom view of an alternative form of expandable plug.

In FIG. 3, there is indicated generally at 44 an unrelieved gage head for more flexible workpieces. The gage head 44 includes halves 46 separated by a slot 48, adapted to being mounted on a stem similar to the stem 28 and to be coupled to an amplifier like the amplifier 12 by a plunger similar to the plunger 14 in the same manner. The gage halves 46 are ground to a full gaging diameter 50, a few thousandths of an inch below the minimum diameter of the workpiece as also described with reference to the gage head 10. The gage head 44 is also formed with a shoulder 52 which may be eliminated if inappropriate for the workpiece to be measured.

Turning now to the drawings, particularly FIGS. 5 and 6, there is shown an alternative approach including a fixture indicated generally at 56, which is useful in measuring the effective diameter of parts of relatively large diameters, on the order of four inches or more, which are somewhat flexible so that a conventional form of measurement would produce inaccuracies by distorting the part, but which are sufficiently resistant to deformation that the part would not closely embrace a conventional expanding split plug under the usual spring pressures furnished by conventional amplifiers but requires additional extra force springs. The fixture 56 comprises a base plate 58 to which is secured a fixed half plug 60 cooperating with a movable half plug 62 which is mounted for movement toward and away from the fixed half on pins 64 fixed to the fixed half and slidable in the movable half. Surrounding each pin 64 is a compression spring 66 extending between the fixed half 60 and the bottom of a counterbore in the movable half. A cam 68 is provided for compressing the springs 66 by engaging a pin 70 pressed in the movable half 62. The cam is rotated by means of a knurled knob 72 formed integral with a short vertical shaft 74 rotatable in the plate 58 and passing loosely through a slot 76 in the movable half 62. The fixture 56 is employed in combination with a special expanding plug gage indicated generally at 78 and including an expanding measuring end portion 80 formed integral with a split tubular stem 82 comparable to the stem 28 of FIG. 2. The measuring portion 80 is expanded by a plunger 84 having a tapered end 86 which enters a cylindrical socket 82 formed in the two parts of the measuring portion. The measuring portion 80 is contracted by pressing a button 20 on the amplifier to retract the plunger 84 and, after the workpiece has been allowed to expand by turning the cam 68 to the solid line position of FIG. 5, is inserted into an accurate bore 90 formed partly in each of the halves 60 and 62 of the fixture. The bore 90 is ground accurately to a standard size, for example 1.000 inch, when the halves 60 and 62 are surrounded by a part of basic effective diameter. Under these conditions, departures from basic effective diameter are read on the dial of the indicator associated with the plug gage 78. The combination of the fixture 56 and the plug gage 78 may thus be considered as acting as a single expanding plug gage such as that including the gage head 44 except for the fact that a greater force is available to cause a workpiece 92 to conform to the outline of the halves 60 and 62 than would be obtained solely from the internal springs of the amplifier 12.

Figure 7:
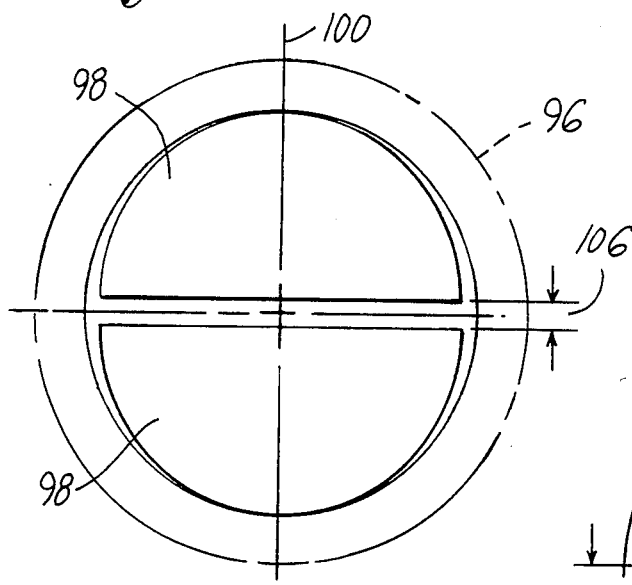
FIGS. 7 and 8 are schematic views showing the respective effect on rigid and flexible workpieces caused by the force of measuring with an expanding plug type gage.
Figure 8:
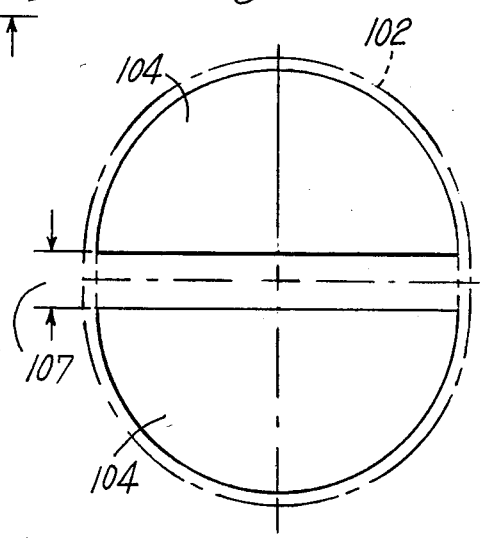

There is shown schematically and in an exaggerated manner in FIGS. 7 and 8, the difference in the relationship of an expanding plug gage in measuring workpieces of maximum internal diameters respectively rigid and flexible. In FIG. 7, a rigid workpiece 96 of maximum diameter is being contacted by the halves 98 of an expanding plug gage, only along a line of plug expansion 100. By contrast, a flexible workpiece 102 is in contact with halves 104 of an expanding plug gage around the entire circumference of each half. The difference in effect is shown as expansions of slots between the halves of the relative plug gages. In FIG. 7, the separation or slot 106 between the halves is equal to K+Tolerance, in which K equals the separation of the halves 98 in gaging a workpiece of basic diameter and Tolerance equals the difference between maximum and basic workpiece diameters. In FIG. 8, the width of a slot 107 between the two halves 104 is wider than the slot 106, the difference resulting from the fact that the flexible workpiece 102 conforms to the shape of the plug halves 104 rather than merely being contacted at two diametrically opposed points as in FIG. 7. The width of the slot 107 is equal to K+Tolerance multiplied by pi/2, in which K equals the same separation as that of FIG. 7. In gaging the flexible workpiece 102 having an effective diameter equal to the basic diameter of the rigid workpiece 96, Tolerance equals the maximum effective diameter of the workpiece 102 less the basic effective diameter of the workpiece and is equal to the diametrical Tolerance of the workpiece 96 and the factor pi/2 is accounted for by the fact that the workpiece 102 contacts the entire periphery of the halves 104 rather than merely diametrically opposed points as in the case of the rigid workpiece 96.

Figure 9:
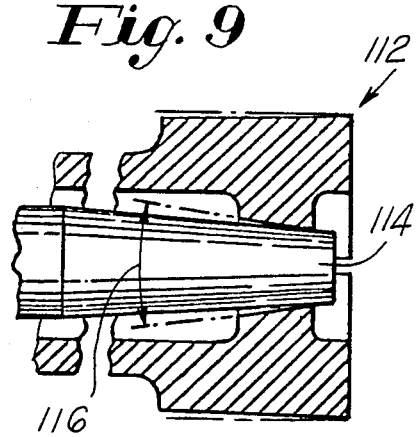
FIGS. 9 and 10 are copies of a longitudinal section and an end view taken from the above identified Darlington patent, identified as prior art and illustrating the engagement of such conventional gages with the workpiece.
Figure 10:
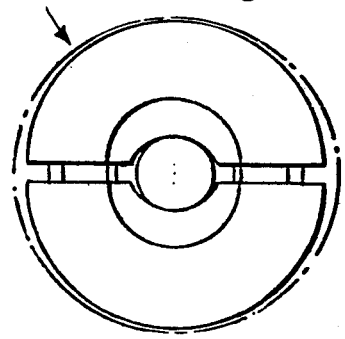

FIGS. 9 and 10 are essentially reproductions of the prior art exemplified by FIGS. 12 and 13 respectively of the drawings of the above identified Darlington patent, showing contact in axial and radial planes respectively between a rigid workpiece and an expanding plug gage indicated generally at 112. The gage 112 includes a plunger having a tapered end 114 which causes the expansion of the gage and accounts in part for translating plug gage expansion into a reading on an associated indicator dial like that of the amplifier-indicator 12. For translating the plug gage expansion, the tapered end 114 is formed with an included angle 116 determined as will now be explained at the same time that its calculation and size are contrasted to an angle 108 shown at the tapered plunger ends 16 and 86 in FIGS. 1 and 6 respectively.

In exploring the differences between the size and calculation of the angles 116 and 108, it is first necessary to establish certain preliminary information upon which the comparison is based. First, each of the related workpieces is being measured by a combination of an expanding plug gage and an amplifier-indicator such as that indicated at 12. In each case, the pointer movement shown as 0.010 inch on the indicator face is caused by a longitudinal plunger motion of 0.084 inch. In the case of the included angle 106, it is calculated as follows:

Tan Angle 116/2 = 0.005/0.084
Angle 116 = 6.813 degrees

For the plungers 14 and 84 used to interpret the effective diameter of a flexible workpiece on the same amplifier-indicator, the included angle 108 is calculated as follows:

Tan Angle 108/2 = 0.005/0.084(pi/2)
Angle 108 = 10.685 degrees

It is seen from the above comparison of the included angles 116 and 108 for rigid and flexible parts whose sizes are to be read from like indicator dials, that it is necessary to make an adjustment in the plunger angle to avoid an erroneous size reading when the part is flexible and conforms to the contour of the expanding plug. Thus, it is also seen that the use of a conventional plug gage, even though of full unrelieved circumference would result in error in measuring a flexible part.

From the foregoing description, taken with the accompanying drawings, many variations within the spirit of the present invention will become obvious to those of ordinary skill in the art. For example, a gage head similar to those already described, whether or not contemplating a separate similar fixture, may be employed with an electronic amplifying and indicating device as taught by my above identified patent, rather than with the mechanical amplifier-indicator already described. It is accordingly not intended that the foregoing specification and the accompanying drawings be taken in a limiting sense but rather than the scope of the invention be interpreted in terms of the appended claims.

Having thus disclosed my invention, what I claim as new and desire to secure by Letters Patent of the United States is:

1. A gage assembly for measuring the effective interior diameter of a relatively flexible workpiece, comprising a generally cylindrical gage head formed of two generally equal parts by a slot, each including a portion of a socket, a hollow stem formed with spring hinges from which the equal parts depend, an amplifier-indicator having a graduated dial upon which the value of a measurement is indicated and means for coupling the amplifier-indicator to the gage head including an elongated plunger slidable within the stem and formed with one end coupled to the amplifier-indicator and the other end tapered and pressed into the socket to amplify the degree of separation of gage head parts thereby causing the workpiece closely to embrace the entire outer periphery of the gage head parts, the included angle of the taper including a factor for translating a circumference measurment of the workpiece resulting from the embracement of the gage head parts by the workpiece into an effective diameter, means forming part of the amplifier pressing the plunger into the socket to urge the parts away from each other at the slot, spring means on the stem urging the parts closer together when the plunger is withdrawn from the socket, the parts each including a flank portion adjacent the slot for restraining the workpiece against radial contraction under the influence of a measuring force extending the workpiece in a direction generally normal to the slot.

2. A gage assembly according to claim 1 further characterized in that the force of measuring is developed along a line generally normal to the direction of the slot and that an intermediate portion of the generally cylindrical contour of each part is relieved from the contour between the line and the flank portion for ease of entry of the gage head into the workpiece.

3. A gage assembly according to claim 1 further characterized in that the degree of taper on the plunger translates the degree of separation of the gage head parts into the effective diameter of the flexible workpiece which closely embraces the gage head.

4. A gage head assembly adapted to being coupled to an amplifying and indicating device for measuring the effective interior diameter of a relatively flexible workpiece and displaying its size on a graduated dial, comprising a generally cylindrical gage head formed of two generally equal parts by a slot, each part including a portion of a socket, a hollow stem formed with spring hinges from which the equal parts depend, an elongated plunger slidable within the stem and formed with one end adapted to relay diameter information to the workpiece of the amplifying and indicating device and the other end tapered and pressed into the socket to amplify the degree of separation of gage head parts thereby causing the workpiece closely to embrace the entire outer periphery of the gage head parts, the included angle of the taper including a factor for translating a circumference measurement of the workpiece resulting from the embracement of the gage head parts by the workpiece into an effective diameter, resilient means pressing the plunger into the socket to urge the parts away from each other at the slot, spring means on the stem urging the parts closer together when the plunger is withdrawn from the socket, the parts each including a flank portion adjacent the slot for restraining the workpiece against radial contraction under the influence of a measuring force extending the workpiece in a direction generally normal to the slot.

5. A gage assembly according to claim 4 further characterized in that the factor in the included angle of the plunger taper for translating the circumference of the workpiece into its effective diameter translates the degree of separation of gage head parts into the effective diameter of the flexible workpiece which closely embraces the gage head.

6. A gage assembly for measuring the interior circumference and translating the circumference measurement into the effective interior diameter of a relatively flexible workpiece comprising a generally cylindrical gage head formed of two generally equal parts by a slot, each part including a portion of a socket, a hollow stem formed with spring hinges from which the equal parts depend, an amplifier-indicator having a graduated dial upon which the value of a measurement is indicated and means for detachably coupling the amplifier-indicator to the gage head including an elongated plunger slidable within the stem and formed with one end coupled to the amplifier-indicator and the other end tapered and urged into the socket to amplify the degree of separation of gage head parts thereby causing the workpiece closely to embrace the entire outer periphery of the gage head parts, the included angle of the taper including a factor for translating the circumference measurement of the workpiece resulting from the embracement of the gage head parts by the workpiece into an indication on the dial of an equivalent effective diameter of the workpiece in undistorted condition, means forming part of the amplifier urging the plunger into the socket to cause the gage head parts to separate at the slot, spring means on the stem urging the parts closer together when the plunger is withdrawn from the socket, the parts each including a flank portion adjacent the slot for restraining the workpiece against radial contraction under the influence of a measuring force extending the workpiece in a direction generally normal to the slot.

* * * * *